United States Patent [19]
Kalmbach

[11] Patent Number: 5,307,968
[45] Date of Patent: May 3, 1994

[54] TRAY FOR USE ON THE PASSENGER SEAT OF A MOTOR VEHICLE AND PROCESS OF SECURING IT IN PLACE

[76] Inventor: John R. Kalmbach, 5261 Wendover Rd., Yorba Linda, Calif. 92666

[21] Appl. No.: 106,591

[22] Filed: Aug. 16, 1993

[51] Int. Cl.$^5$ .............................................. B60R 7/00
[52] U.S. Cl. .................... 224/275; 224/42.42; 224/273; 296/37.015
[58] Field of Search ............... 224/275, 42.42, 42.43, 224/273; 296/37.15; 297/188; 108/44, 45, 46

[56] References Cited

U.S. PATENT DOCUMENTS 4,909,159  3/1990  Gonsoulin ........................... 108/44
5,253,791  10/1993  Chiodo ................................ 224/275

Primary Examiner—Ernest G. Cusick
Assistant Examiner—David J. Walczak
Attorney, Agent, or Firm—Edgar W. Averill, Jr.

[57] ABSTRACT

A tray for use on the passenger seat of a motor vehicle. The tray has a tray base which rests on the passenger seat and has one or more compartments for holding articles in a manner which is accessible to the motor vehicle driver. At least one sponge-like member is held to the edge of the tray which is next to the passenger door. The tray is secured to the passenger seat by opening the passenger door, allowing the resilient member to rest against the side of the passenger seat and then slamming the passenger seat door to compress the resilient member and hold the tray on the seat.

10 Claims, 3 Drawing Sheets

TRAY FOR USE ON THE PASSENGER SEAT OF A MOTOR VEHICLE AND PROCESS OF SECURING IT IN PLACE

BACKGROUND OF THE INVENTION

The field of the invention is automobile accessories and the invention relates more particularly to trays of the type for storing articles for use by the driver of the motor vehicle.

Numerous articles have been devised which assist in holding a coffee cup or other object on the console located between the driver seat and the passenger seat. There is, however, a much larger area for storage of articles which is not commonly used, i.e., the passenger seat. In spite of all efforts to encourage ride sharing and carpooling, the vast majority of automobiles on the highway today contain only a driver and no passenger. This is especially true for the commuting driver or traveling salesman. Many times, the driver will place an object on the passenger seat only to find it sliding off the seat when going around the curve or stopping suddenly. The prior art does not provide a solution to this problem. A padded panel is securely held to the rear seat of an automobile in U.S. Pat. No. 3,600,725. There is an inflated portion which is inflated to hold the object in place. This is evident by comparing FIGS. 3 and 4 of the drawings. A contoured lap tray is shown in U.S. Pat. No. 4,052,944. Neither of these patents suggest any method for securing a tray or other object on the passenger seat of a motor vehicle.

SUMMARY OF ME INVENTION

It is an object of the present invention to provide an easily used process and an article for securing a storage tray on the passenger seat of a motor vehicle which device is also easily removed from the motor vehicle.

The Present invention is for a tray for use on a passenger seat of a motor vehicle of the type having a passenger side door and a passenger seat with a side adjacent to passenger side door. A tray has a base with an upper surface and a lower surface, and an edge adjacent the passenger side door. At least one compartment is held on the upper surface of the tray base. At least one resiliently compressible member is held to the edge of the tray adjacent the passenger door, and this compressible member is squeezed between the passenger side door and the outer edge of the Passenger seat so that the tray is securely held on the seat. Preferably the tray has a plurality of compartments arranged in an arc-like manner so that the driver can easily reach all of the compartments without having to lean over. Preferably the compressible member is adjustably positioned along the edge of the tray so that it may be placed in an ideal position depending on the configuration of the seat and passenger door. Also, preferably, there are two resilient members so that they do can be spaced apart so that they do not interfere with any electrical seat controls on the side of the passenger seat. The method of using the tray of the present invention involves opening the passenger side door placing the tray on the passenger seat with its resilient member hanging over the side of the seat and then slamming the passenger door against the resilient member to squeeze it securely in place.

DESCRIPTION OF THE PREFERRED EMBODIMENTS

Figure 1:
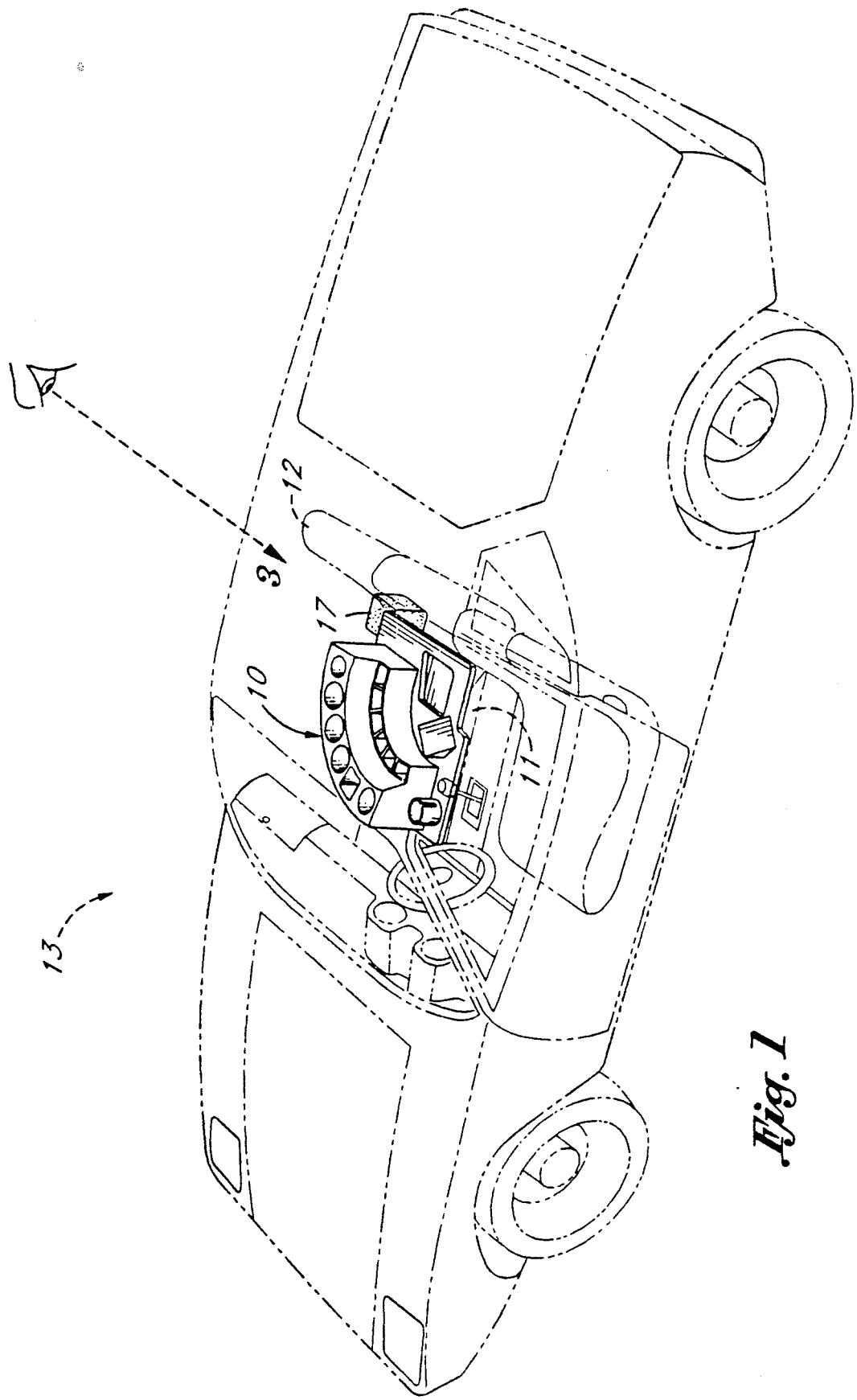
FIG. 1 is a perspective view of the tray of the present invention shown on the passenger seat on a motor vehicle shown in phantom view.
Figure 4:
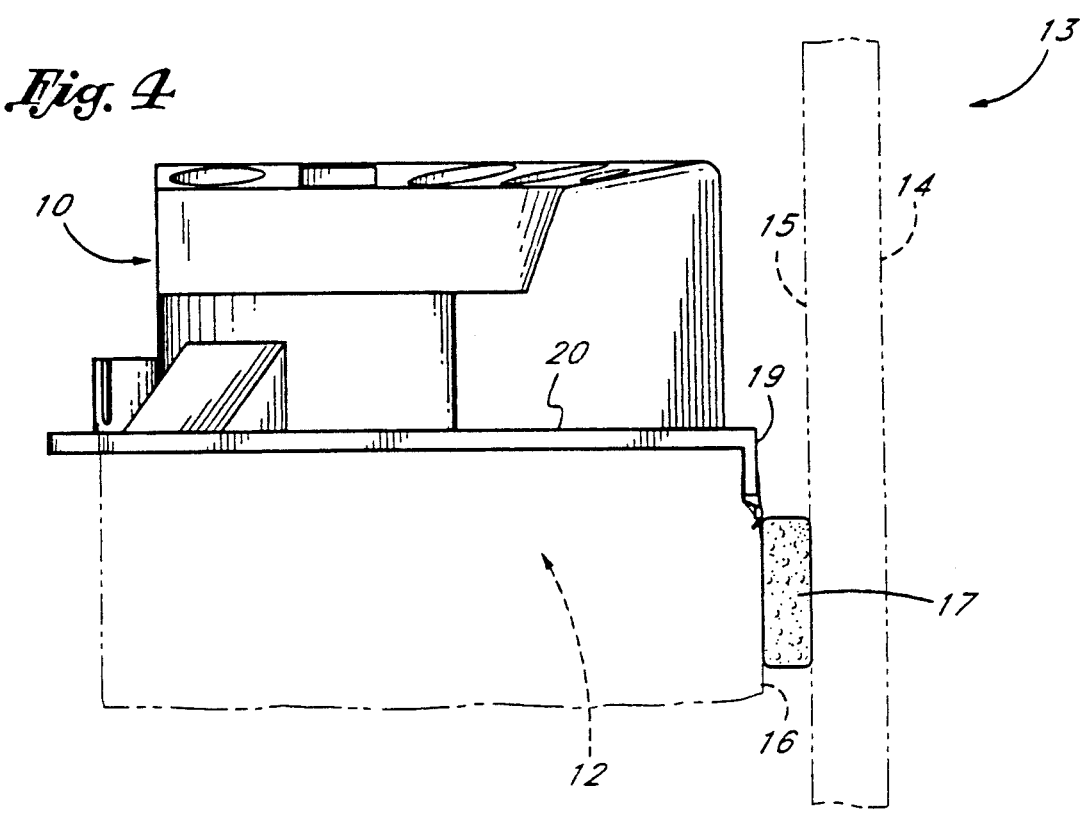
FIG. 4 is a view from the back of the passenger seat showing the resilient member compressed between the passenger seat and the passenger door.
Figure 5:
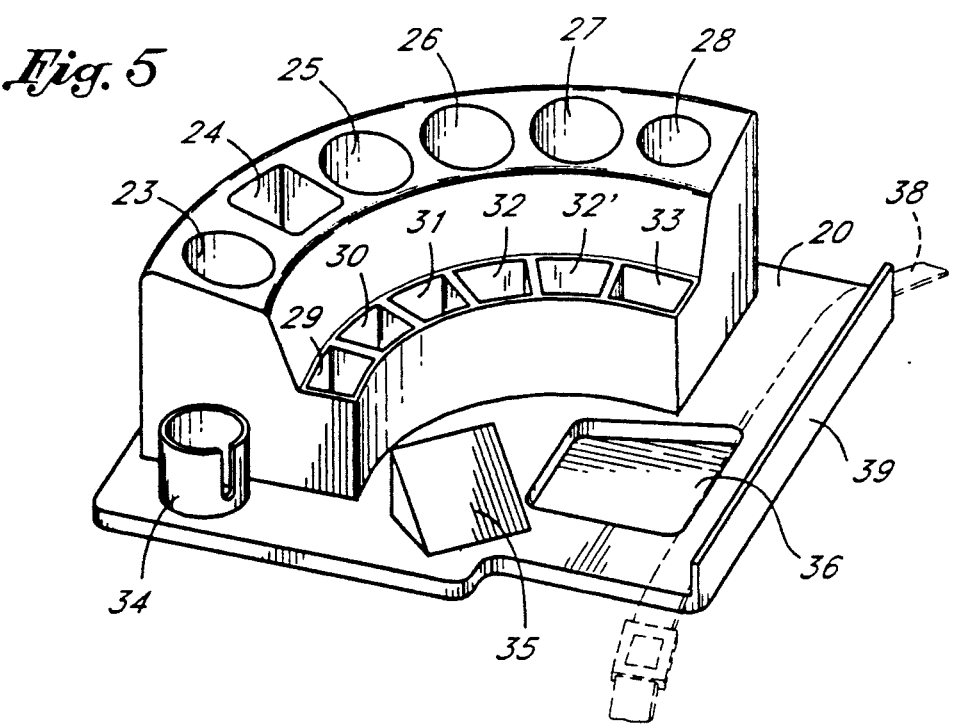
FIG. 5 is a perspective view of an alternate embodiment of the tray of FIG. 2.

The tray of the present invention is shown in perspective view in FIG. 1 and indicated generally by reference character 10. Tray 10 is shown on the seat surface 11 of passenger seat 12 of auto 13. As shown best in FIG. 4 of the drawing, automobile 13 has a passenger door 14 with an inner surface 15. The passenger seat 12 has a side 16 adjacent passenger door 14. A pair of resilient members 17 and 18 are adjustably held along side 19 of tray 10 and is squeezed as shown in best in FIG. 4, between the inner surface 15 of door 14 and side 16 of seat 12. This provides an exceptional support which is easily made removable by simply opening passenger door 14.

Figure 3:
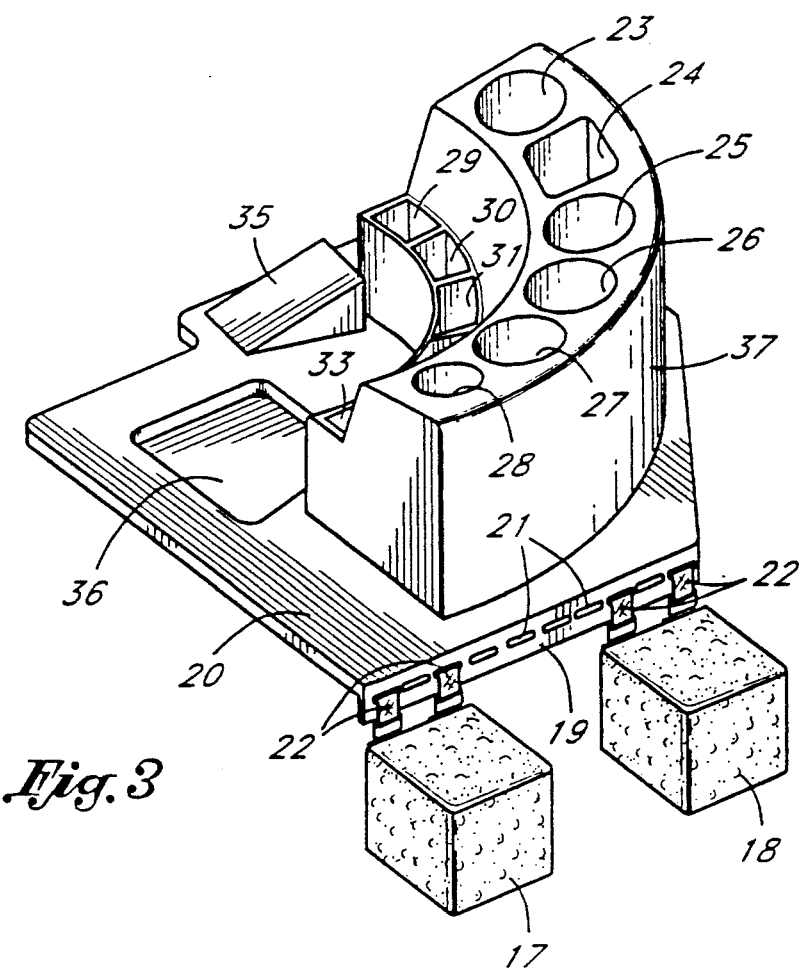
FIG. 3 is a perspective view showing the resilient members affixed to the edge of the tray adjacent the passenger door.

As shown in FIG. 3, resilient members 17 and 18 are adjustably held along side 19 of tray base 20. A plurality of slots 21 are formed along side 19 which permits the insertion of nylon straps 22 at a preferred position. Many car seats have electrical controls along the side 16 and it is important that resilient members do not interfere with such controls.

Figure 2:
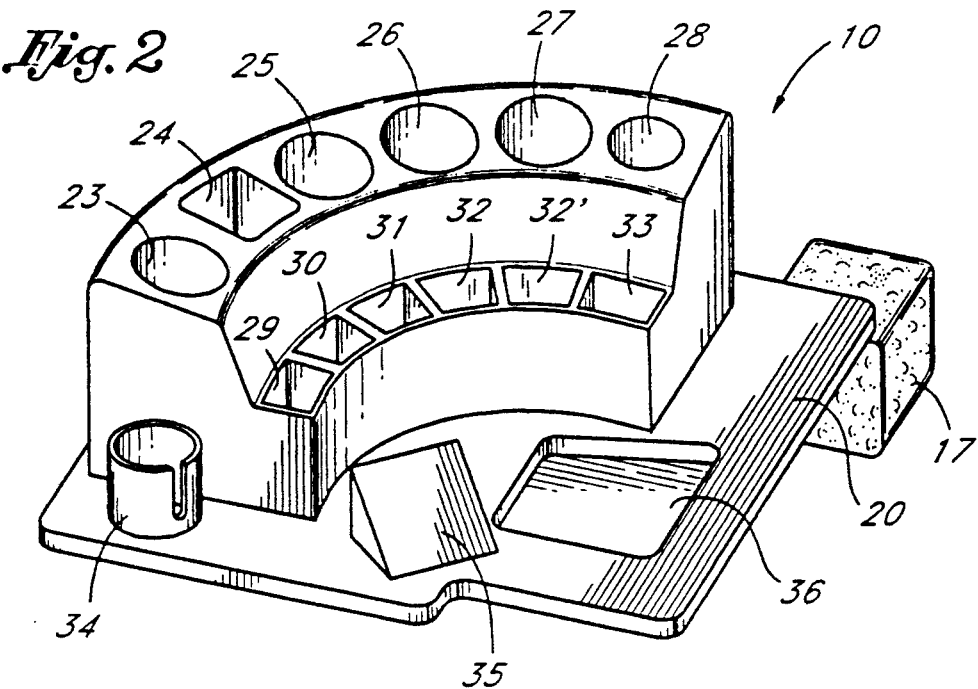
FIG. 2 is a perspective view of the tray of FIG. 1.

As shown in best in FIG. 2, tray 10 has a base 20 from which various compartments extend. For instance, as a typical configuration compartments 23, 24, 25, 26, 27, and 28 are arrayed along an arcuate path which is positioned so that the driver of auto 13 can reach all compartments with an equal degree of ease. More shallow compartments 29, 30, 31, 32, 32' and 33 are also arrayed in an arc and may be used for different articles. A cup supporting article 34 help support a coffee cup, and a writing surface 35 makes it easy for the driver to take notes. A recessed surface 36 permits additional storage of easy to retrieve objects.

Returning to FIG. 3 and the construction of the resiliently compressible members 17 and 18, it is preferred that they be fabricated from a lightweight sponge material such as sponge rubber, which may be held in a net or other type of bag which in turn is held by straps 22. In the event of a sudden stop of a vehicle, straps 22 securely prevent the tray from any significant movement although a slight amount of forward movement would exist but not sufficient to cause the tray to fall off the seat. The remarkable ease of which the tray may be removed may be visualized by picturing the opening of the passenger door which permits the tray and its contents to be easily lifted off the passenger seat. The tray itself is injection molded or vacuum formed from plastic and may be both low in cost and light in weight. Passenger seats are invariably sloped downwardly toward the rear of the motor vehicle, and the base of the tray should, of course, be angled so that the upper surface is close to horizontal. Also shown best in FIG. 3, the back wall 37 of the outer row of compartments 23 through 28 is sloped so that the outer edge of the compartment is angled toward the center of the arc. In this way, in the event of a sudden stop, any object in a compartment will tend to be pressed downwardly toward the bottom of each of the compartments.

While the resilient members have been discussed as sponge or foam materials, they could, of course, be inflatable members which of course, would also be resilient and compressible. Such devices unlike that shown in U.S. Pat. No. 3,600,725 would be inflated before the door is closed.

Alternatively, tray 10 may be secured to passenger seat 12 by seatbelt 38. Seatbelt 38 is held against base 20 by being tightened in a conventional manner. The tray 10 will not move forward in a sudden stop because it is held by wall 39.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A tray for use on the passenger seat of a motor vehicle having a passenger seat with an outer edge and a passenger door, said tray comprising:
   a tray base having an upper surface, a lower surface and an edge adjacent the passenger door;
   at least one compartment on the upper surface of said tray base; and passenger door;
   at least one compartment on the upper surface of said tray base; and
   at least one resiliently compressible member held to the edge of the tray base adjacent the passenger door, said at least one resiliently compressible member being squeezed between the passenger door and the outer edge of the passenger seat.

2. The tray for use on the passenger seat of a motor vehicle of claim 1 wherein said at least one resiliently compressible material is a resilient sponge material.

3. The tray for use on the passenger seat of a motor vehicle of claim 1 wherein there are two resiliently compressible members.

4. The tray for use on the passenger seat of a motor vehicle of claim 3 wherein the position of the resiliently compressible members is adjustable along the edge of the tray base adjacent the passenger door.

5. The tray for use on the passenger seat of a motor vehicle of claim 4 wherein said edge of the tray base adjacent the passenger door has a plurality of slots and the resiliently compressible members are supported by at least one strap passed through one of said plurality of slots.

6. The tray for use on the passenger seat of a motor vehicle of claim 1 wherein a plurality of upwardly directed compartments are held on the upper surface of said tray base.

7. The tray for use on the passenger seat of a motor vehicle of claim 6 wherein said plurality of upwardly directed compartments are positioned in an arc.

8. The tray for use on the passenger seat of a motor vehicle of claim 7 wherein there are two rows of upwardly directed compartments.

9. The tray for use on the passenger seat of a motor vehicle of claim 1 wherein said tray base is horizontal.

10. A method for supporting an object on the upper surface of the passenger seat having a side adjacent the passenger door of a motor vehicle having a passenger door comprising the steps of:
   opening the passenger door of the motor vehicle;
   placing a tray, having a downwardly depending resilient member, on the upper surface of the passenger seat so that the downwardly depending resilient member extends over at least a portion of the side of the passenger seat adjacent the passenger door, said resilient member having an uncompressed size, said uncompressed size being greater than the space between the passenger door and the side of the passenger seat; and
   closing the passenger door thereby wedging the resilient member between the passenger door and the side of the passenger seat adjacent the passenger door and securing the tray on the upper surface of the passenger seat.

* * * * *